May 5, 1942.　　W. J. SCOTT ET AL　　2,282,252
ARTICLE COATING APPARATUS
Filed June 25, 1940　　9 Sheets-Sheet 1
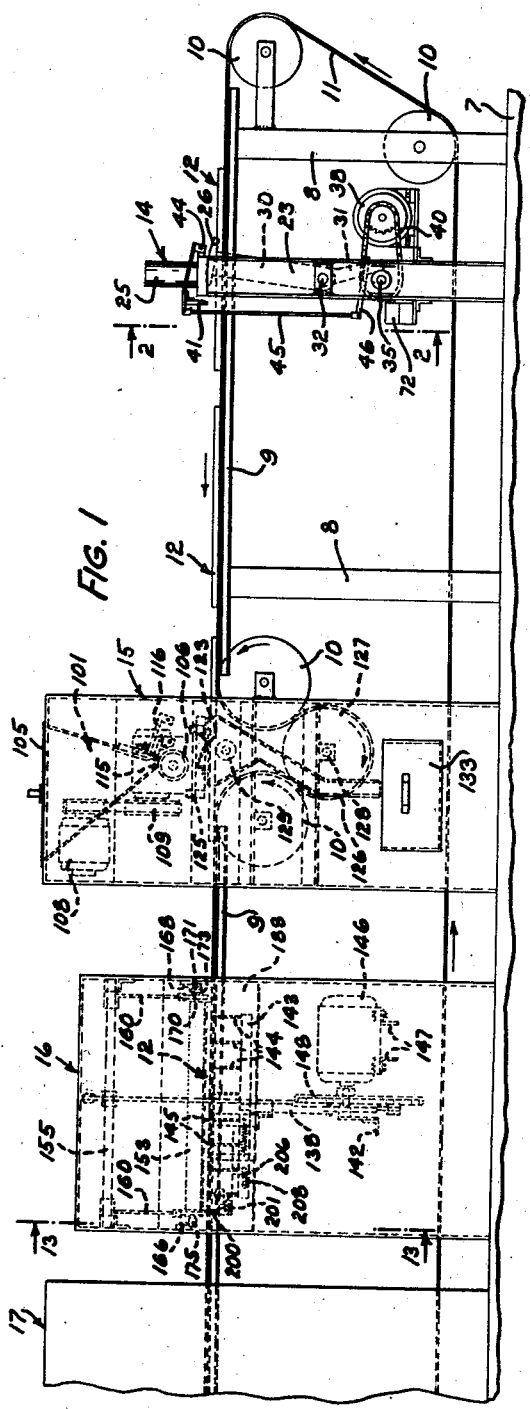
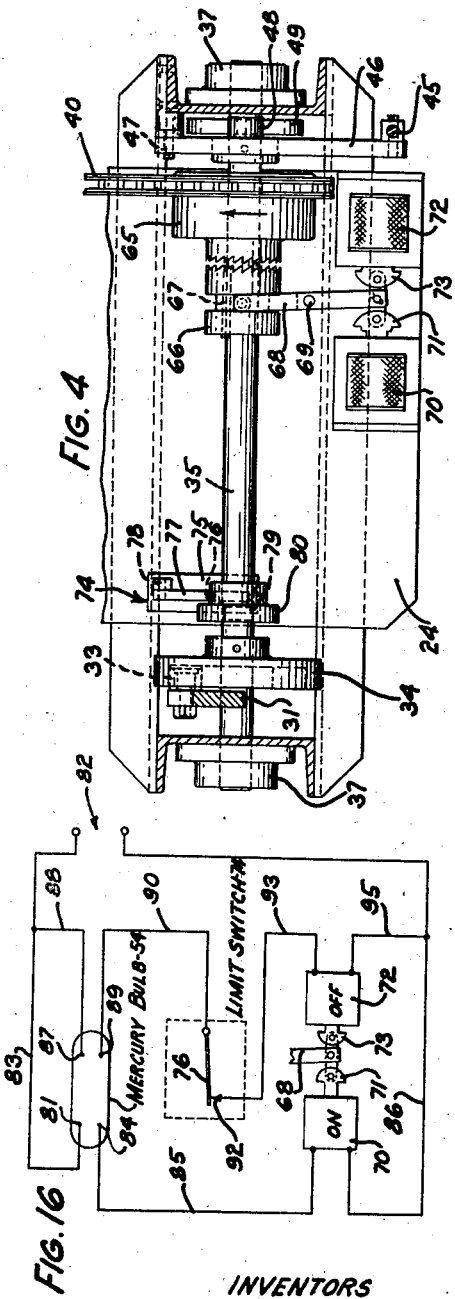
INVENTORS
W. J. SCOTT
G. STUHLFAUTH
BY Emery Robinson
ATTORNEY

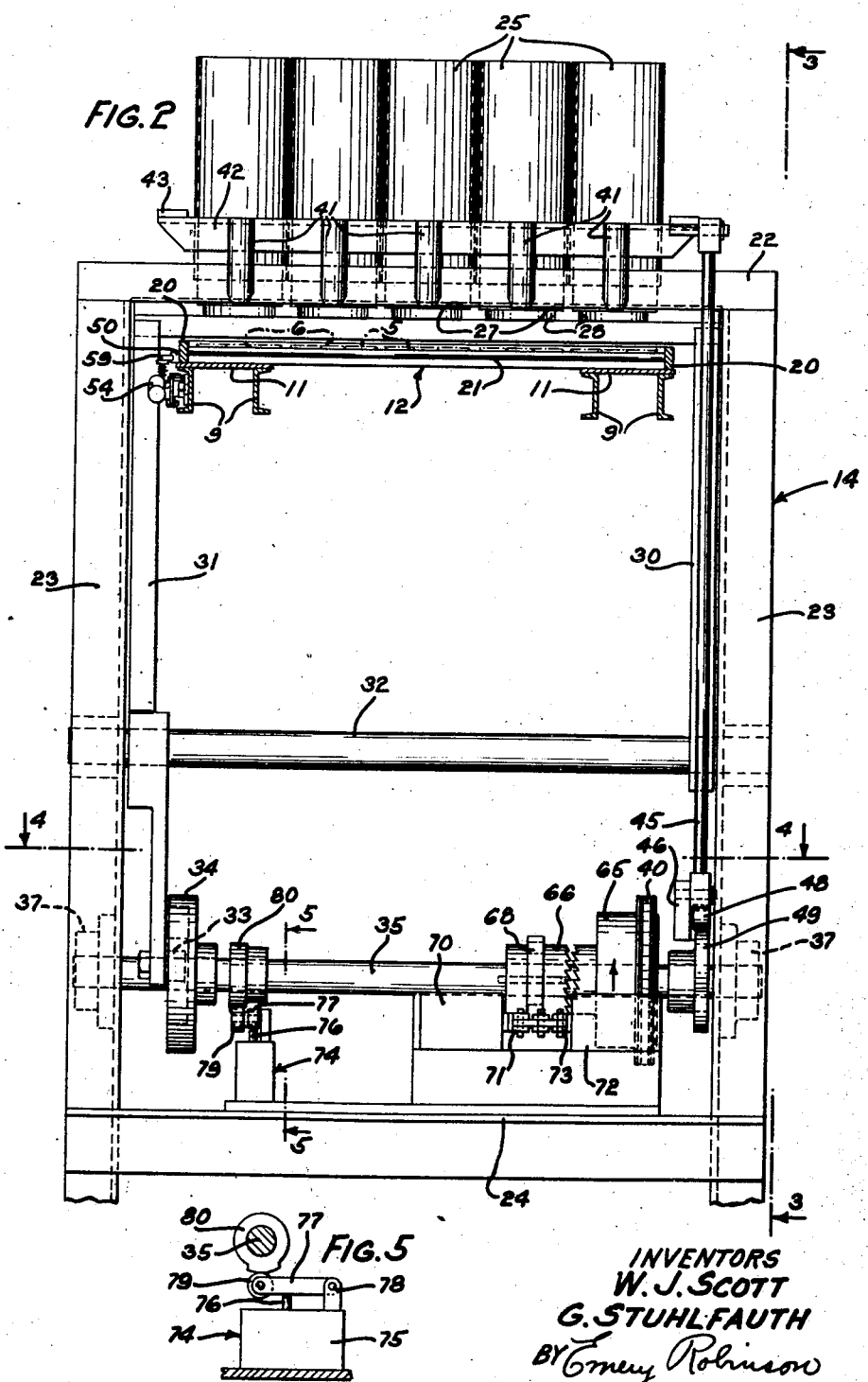

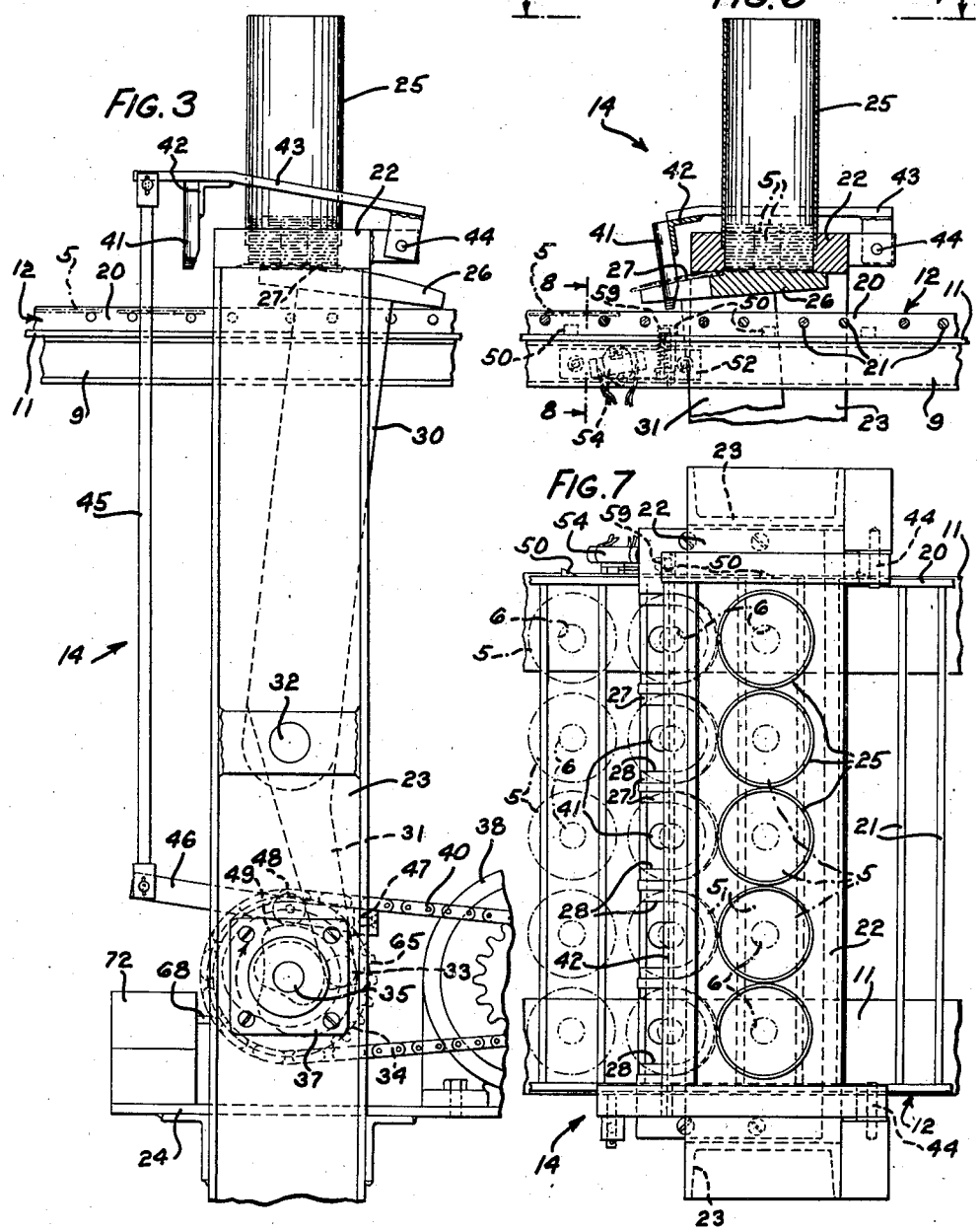

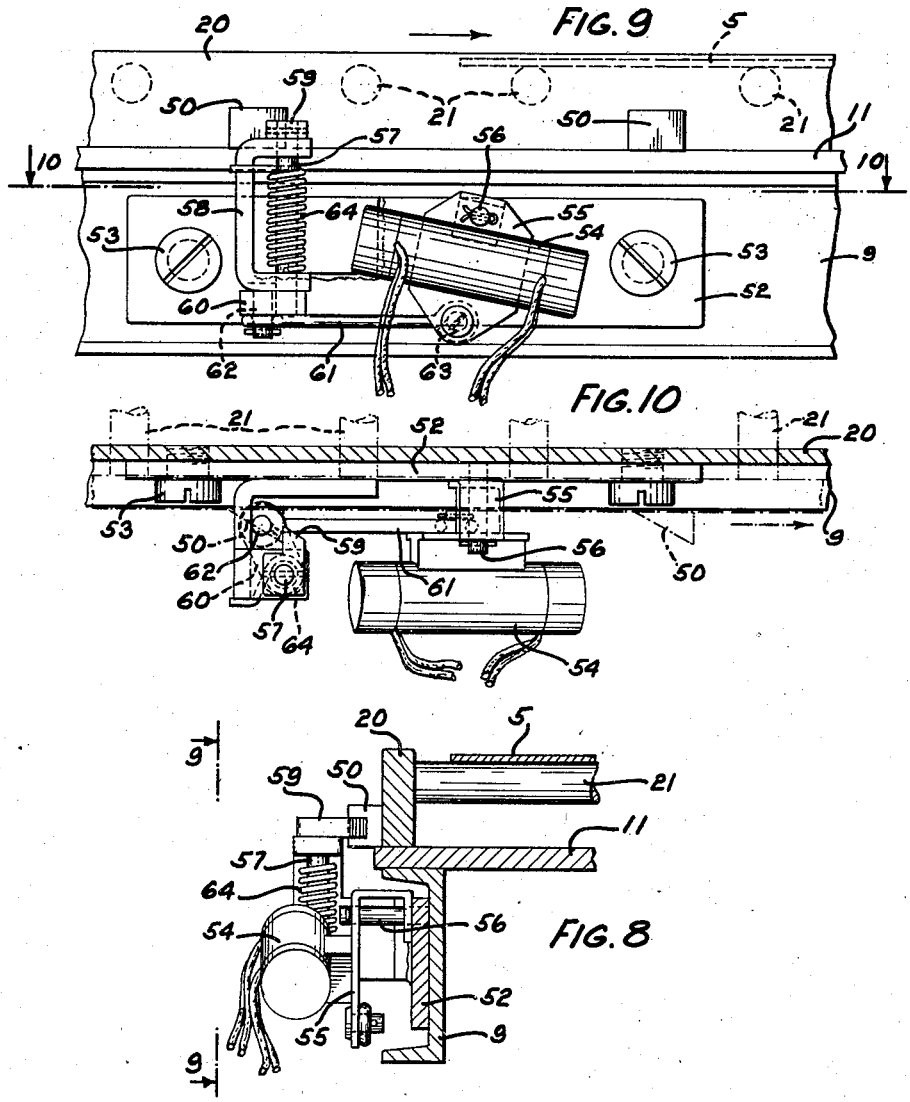

INVENTORS
W. J. SCOTT
G. STUHLFAUTH
BY Emery Robinson
ATTORNEY

Patented May 5, 1942

2,282,252

UNITED STATES PATENT OFFICE 2,282,252

ARTICLE COATING APPARATUS

Walter J. Scott, Hinsdale, and George Stuhlfauth, Chicago, Ill., assignors to Western Electric Company, Incorporated, New York, N. Y., a corporation of New York Application June 25, 1940, Serial No. 342,218

21 Claims. (Cl. 91—43)

This invention relates to article coating apparatus, and more particularly to apparatus for applying a vitreous enamel coating on articles.

An object of this invention is the provision of an improved apparatus for rapidly and efficiently applying a uniform and durable coating of vitreous enamel on a portion of an article surface.

In one embodiment of the invention, an apparatus is provided for applying enamel on one surface of substantially flat articles, such as telephone dial number plates. The apparatus comprises a moving belt which conducts article supporting carriers or trays successively through an article loading position, an enamel applying unit, a tray cleaning mechanism, and a furnace. In the loading position, mechanism responsive to the travel of the carrier deposits the articles in spaced relation on the moving carrier. In the enamel applying unit, vitreous enamel in the form of fine particles is distributed uniformly over the tray area. In the cleaning mechanism, which is also actuated by the carrier movement, a series of bars lift the enamel covered articles from the carrier and a pair of rotary brushes sweep the enamel from the carrier surface, after which the articles are returned to the carrier. The enamel bearing blanks on the clean carriers are then passed into a furnace where the enamel is fused into a smooth, uniform and durable coating.

Following is a more detailed description of the invention taken in conjunction with the appended drawings, in which Fig. 1 is an elevation partly in section of a coating apparatus embodying certain features of the invention;

Fig. 2 is an enlarged and sectional view of a portion of the apparatus shown in Fig. 1, taken on the line 2—2;

Fig. 3 is a sectional view of Fig. 2, taken on the line 3—3;

Fig. 4 is a sectional view of Fig. 2 taken on the line 4—4;

Fig. 5 is a sectional view of Fig. 2, taken on the line 5—5;

Fig. 6 is similar to Fig. 3 and shows this portion of the apparatus at a different stage of its operating cycle;

Fig. 7 is a sectional view of Fig. 6 taken on the line 7—7;

Fig. 8 is a partial view in section of Fig. 6 taken on the line 8—8;

Fig. 9 is a sectional view of Fig. 8 taken on the line 9—9;

Fig. 10 is a sectional view of Fig. 9 taken on the line 10—10;

Fig. 16 is a wiring diagram for a portion of the apparatus shown in Fig. 1; and

Fig. 17 is a wiring diagram for another portion of the apparatus shown in Fig. 1.

Figure 11:
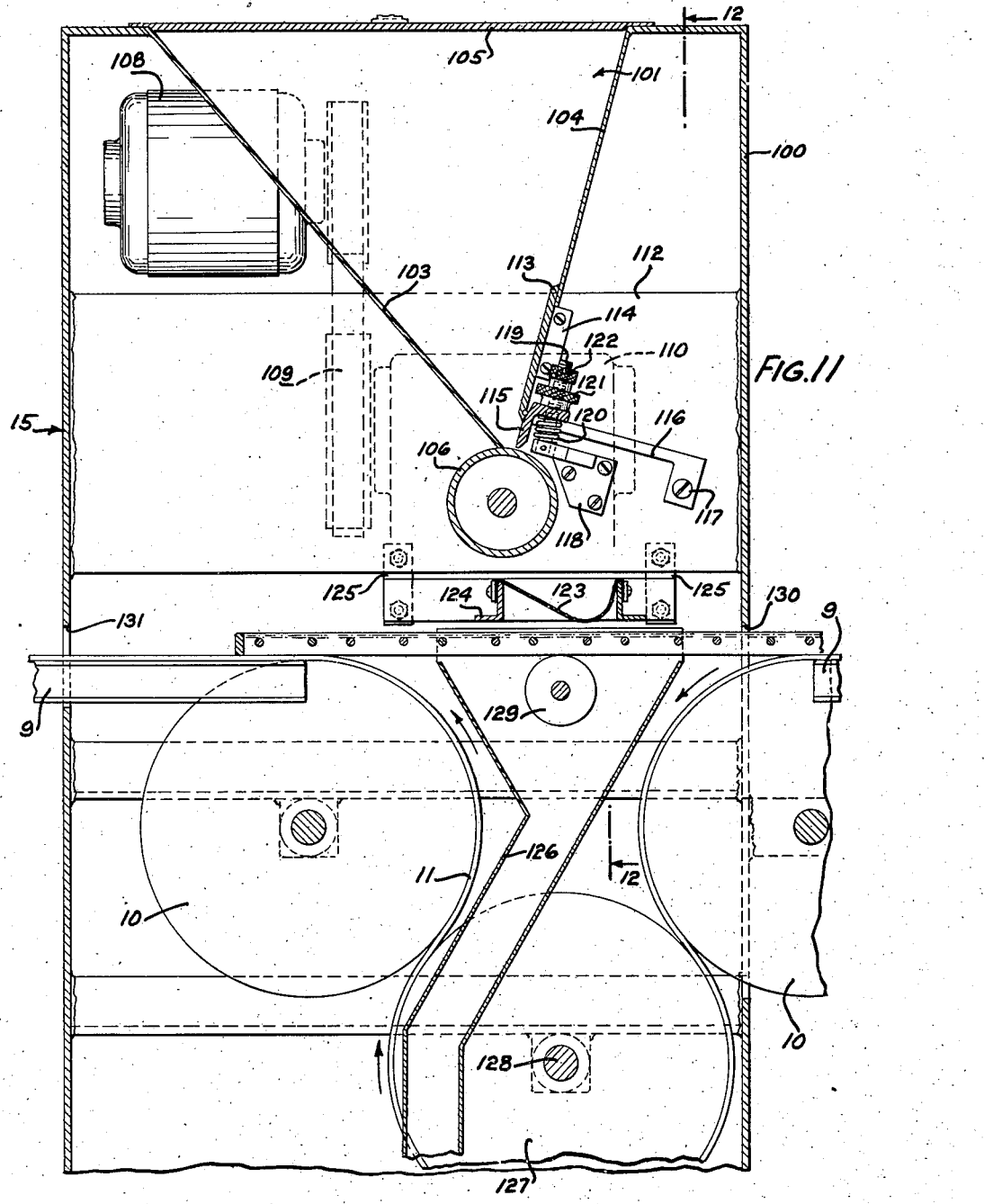
Fig. 11 is an enlarged view in section of a portion of the apparatus shown in Fig. 1.

The specific apparatus shown in the drawings is primarily adapted for the enameling of telephone dial number plates and similar articles. Telephone dial number plates 5, as best shown in Figs. 6 and 7, comprise a substantially flat, ring-shaped body with a central opening 6 therein. These number plates are usually punched from sheet metal and a vitreous enamel coating is applied on one face of the plate.

The general arrangement of the apparatus for applying this enamel coating is shown in Fig. 1. Mounted on a floor 7 or base is a frame 8 made of structural members suitably braced. On the top of the frame are mounted a pair of parallel and elongated ways 9, each formed of two spaced channels. Supported on each of these ways and on a series of pulleys 10 suitably mounted on the frame below the ways is a continuous belt 11. The belts are driven by a suitable motor (not shown). Carried on the parallel belts above the ways are trays 12 on which the articles to be coated are supported. The moving belts carry the trays and articles along the ways first through a loader 14, where the articles are deposited on the tray from hoppers and then through an enamel applicator 15 which deposits particles of enamel frit uniformly over the tray area. The belts then carry the trays and articles through a cleaner 16 where the enamel is removed from the trays and finally into a furnace 17 in which the enamel is fused into a coating.

The article supporting trays (Figs. 6 and 7) have a substantially rectangular frame 20 formed of bar stock and a series of spaced transverse cylindrical rods 21 extending between and secured, as by welding, to the side members of the frame. These rods are arranged in pairs for supporting the articles.

The loader (Figs. 2 and 3) has a skeletonized frame made of structural members welded together. This frame comprises a horizontal top plate 22 which is positioned just above the path of the trays and is supported on top of two legs 23 secured to the floor. Extending between and fixed to the legs just above the floor is a shelf and cross brace 24.

Extending above and through the top plate are a series of five tubular hoppers 25 of sheet metal containing the articles to be coated. The bottom of each of these hoppers is formed by a feeder plate 26 which is adapted to withdraw the bottom blank in each hopper and move it forward in the direction of tray travel. As best shown in Figs. 6 and 7, the feeder plate has five recesses 27 in its top surface. One recess corresponds to each hopper and is adapted to receive the bottom article in the hopper. A portion 28 of the feeder plate within each recess is cut away so that the article rests upon a ledge.

The feeder plate is supported across two spaced arms 30 and 31 (Fig. 2) secured to its end portions. Both arms are pivoted on a horizontal shaft 32 extending between the frame legs. The right arm 30 (as viewed in Fig. 2) terminates at the shaft. The left arm 31 extends below the shaft and the extension carries a roller 33 in engagement with a grooved cam 34 on a drive shaft 35 supported in bearings 37 in the machine frame. The drive shaft is rotated by a motor 38 through a chain 40 (Fig. 3). The groove in the cam 34 is cut to cause the feeder plate to move forward and back across the bottom of the hoppers during one revolution of the cam.

A series of five article stripping pins 41, one for each hopper, are provided for removing the articles from the feeder plate in their forward position. These stripping pins depend from a yoke having a pin supporting bar 42 extending across the front of the hoppers and a side member 43 at each end thereof extending alongside of the hoppers. The side members are each mounted on a hinge 44 on the top plate 22 of the frame to permit and up and down movement of the pins. The stripper pins are actuated through a rod 45 hinged to the right forward edge (Figs. 2 and 3) of the pin supporting bar. Hinged to the lower end of this rod is one end of a lever 46 having its opposite end mounted on a pin 47 bracketed on the frame leg and an intermediate roller 48 riding on a cam 49 fixed to the drive shaft.

The cam 49 is shaped to cause the stripper pins to come down and enter the center holes in the articles at the moment the feeder plate becomes fully advanced (Fig. 6). During this movement the stripper pins pass through the cut-out portions in the feeder plate. The pins remain in their down position and hold the articles while the feeder plate returns to its normal position. As soon as the feeder plate withdraws sufficiently to clear the articles, the articles slide off of the pins onto the tray which is positioned below the ends of the pins.

The operation of the loader and the travel of the trays along the ways on the belts is coordinated to insure the proper positioning of the article on the trays. To accomplish this, the loading operation is controlled by a switch actuated by the movement of the tray. On the outside of the tray frame (Figs. 8, 9 and 10) are a series of spaced, switch-operating lugs 50, one lug being provided for each pair of article supporting rods in the tray. These lugs actuate a conventional mercury switch mounted on a pad 52 secured with screws 53 to the ways 9 just below the path of the tray.

The switch comprises a mercury containing bulb 54 with the usual contacts therein and lead wires secured thereto. The arrangement of the contacts and leads will be described later. The mercury bulb is supported on a shaped bracket 55 having its upper end portion pivotally supported on a pin 56 extending from the pad. Adjacent to the mercury bulb is a vertical shaft 57 rotatably mounted in a U-shaped support 58 on the pad 52. Fixed to and extending from the top of the shaft above the support is a lug 59 adapted to be engaged by the tray lugs in passing. Fixed to and extending from the bottom of this shaft is an offset extension 60. A link 61 connects the outer end of this extension with the bottom portion of the mercury bulb carrying bracket 55. The link is mounted on a pin 62 on the shaft extension and a pin 63 on the mercury bulb bracket. A helical spring 64 encircling the shaft 57 has its lower end embedded in the shaft and its upper end engaging the shaft support. Thus, when the tray lug engages the lug on the shaft, the shaft is rotated and this movement in turn tilts the mercury bulb through the link 61. As soon as the tray lug passes the shaft, the helical spring restores the shaft and the mercury bulb to their normal positions. These movements of the mercury switch control operation of a single revolution clutch on the drive shaft.

As stated previously, the loader is driven through the drive shaft 35 by means of the chain 40. The chain engages and drives a collar 65 (Fig. 4) which normally floats on the drive shaft and comprises one member of a toothed clutch. The other clutch member is a collar 66 which is slidably fixed to the drive shaft through a spline 67. Yoked on and extending downwardly from this collar is a clutch lever 68 having its intermediate portion fulcrumed on a fixed pin 69 extending from the machine frame and its lower end portion secured to the plungers of two opposed solenoids mounted on the frame. The left solenoid 70 (Fig. 4) when energized attracts its plunger 71 and shifts the clutch lever and splined collar to the right to engage the clutch. The right solenoid 72 when energized attracts its plunger 73 to shift the lever and splined collar to their normal positions and thus release the clutch.

Positioned below the drive shaft to the left of the clutch (Figs. 2 and 5) is a circuit holding and limit switch 74. This switch comprises a contact box 75, a plunger 76 for making and breaking the contacts and a plunger actuating arm 77. This arm has one of its ends mounted on a pivot 78 and has a roller 79 at its other end which bears, under spring pressure on the plunger, against a cam 80 on the drive shaft.

The circuit diagram for the mercury switch, solenoids and the limit switch is shown in Fig. 16. The mercury switch contains two pairs of contacts which are engaged alternately as the bulb is tilted by tray movement and returned to normal. In one of these sets of contacts, which are made when the mercury bulb is tilted by the tray lug, one contact 81 is connected to a power source 82 through wire 83 and the other contact 84 is connected to the winding of the clutch engaging solenoid 70 through a wire 85. The other side of this solenoid winding is connected to the power source by a wire 86. In the other set of contacts in the bulb, which are normally closed, one contact 87 is connected to the power source through wire 88 and the other contact 89 is connected through a wire 90 to the plunger 76 in the limit switch 74. A fixed contact 92 in the limit switch is connected by a wire 93 to the winding of the clutch releasing solenoid 72 and the other side of the solenoid winding is connected by a wire 95 to the power source.

In the operation of this circuit, the contacts 81 and 84 are connected by the mercury in the bulb when the shaft on the switch is engaged by a tray lug and the bulb is tilted from its normal position. This completes the circuit to solenoid 70, which engages the clutch and starts rotation of the drive shaft. As soon as the tray lug passes the switch, the helical spring on the switch returns the bulb to normal, which opens contacts 81 and 84 and closes contacts 87 and 89 in the limit switch circuit. Meanwhile, the cam 80 on the limit switch plunger has been rotated by the drive shaft sufficiently to separate the plunger 76 and contact 92 in the limit switch. These limit switch contacts remain open until the cam nears the end of one complete revolution, at which time the cam moves the plunger into engagement with the contact to complete the circuit to the clutch releasing solenoid 72. At this time the circuit to solenoid 70 has been broken, by restoration of the mercury bulb and opening of bulb contacts 81 and 84, and the solenoid 72 is thus able to shift the lever 68 and release the clutch to stop the machine. When the mercury switch is engaged by the next tray lug, the circuit through the limit switch to solenoid 72 is opened initially, by movement of the bulb and opening of contacts 87—89, which permits solenoid 70 to operate and engage the clutch.

As stated above, there is one switch-actuating lug on the tray frame for each pair of article supporting rods in the tray. As each of these lugs engages the switch, the loader is caused to operate through one complete cycle and deposit a row of five articles on each corresponding pair of tray rods. Thus the articles are positioned in parallel rows over the tray surface.

After the trays are loaded, they are carried by the moving belts into the enamel applicator 15. This portion of the apparatus is enclosed in a sheet metal cabinet 100 (Figs. 11 and 12) that is suitably framed with structural members.

In the upper portion of this cabinet is a hopper 101 containing the vitreous enamel frit in the form of small particles. This hopper has parallel end walls 102, a sloping forward wall 103, a sloping rear wall 104, and a removable cover 105. The bottom of the hopper is formed by a cylindrical roller 106 rotatably mounted in bearings 107 in the frame. This roller is driven by a motor 108 and belt 109 through a variable speed reducer 110 which is connected to the roller through an extension 111 on the roller.

The roller engages the forward hopper wall 103 and rotates towards a gate mounted on the lower end portion of the rear wall 104. The gate is adjusted to regulate accurately the quantity of enamel frit removed from the hopper by the rotating roller. The gate is supported between two rigid and parallel mounting plates 112 which form a part of the frame. The gate comprises a fixed plate 113 inside the hopper and extending along the bottom of the rear hopper wall 104. This plate is supported by a bracket 114 on each mounting plate. Positioned in the opening between the bottom of this fixed plate and the roller is an adjustable gate member 115 which is pivotally supported across the full length of the gate opening. The adjustable member is an angle and fixed to each end portion thereof is a supporting arm 116, which is pivoted on a bolt 117 in a mounting plate. These arms support the angle and also permit the angle to move through an arc in the hopper opening in close engagement with the fixed plate.

A gate adjusting mechanism is mounted at each end of the angle on fixed brackets 118 on the mounting plates 112. Extending from each bracket is a threaded member 119 which passes through a hole in the angle and there is a coiled spring 120 around the threaded member between the angle and the bracket. Threaded onto the member above the angle is an adjusting nut 121 and a lock-nut 122. By manipulation of these nuts, the position of the angle and the size of the gate opening can be accurately adjusted.

Below the hopper in the path of the enamel falling from the roller is a screen 123 in a frame 124 supported on straps 125 hung from the mounting plates. The screen is positioned just above the path of the article bearing trays and extends across the full tray width, so that all of the enamel passes through the screen in its passage from the hopper to the articles.

Below the tray is a chute 126 for receiving the enamel frit that is not accumulated on the articles or the tray. This chute leads to a suitable receptacle 133 (Fig. 1) from which the frit is returned periodically to the hopper.

Figure 12:
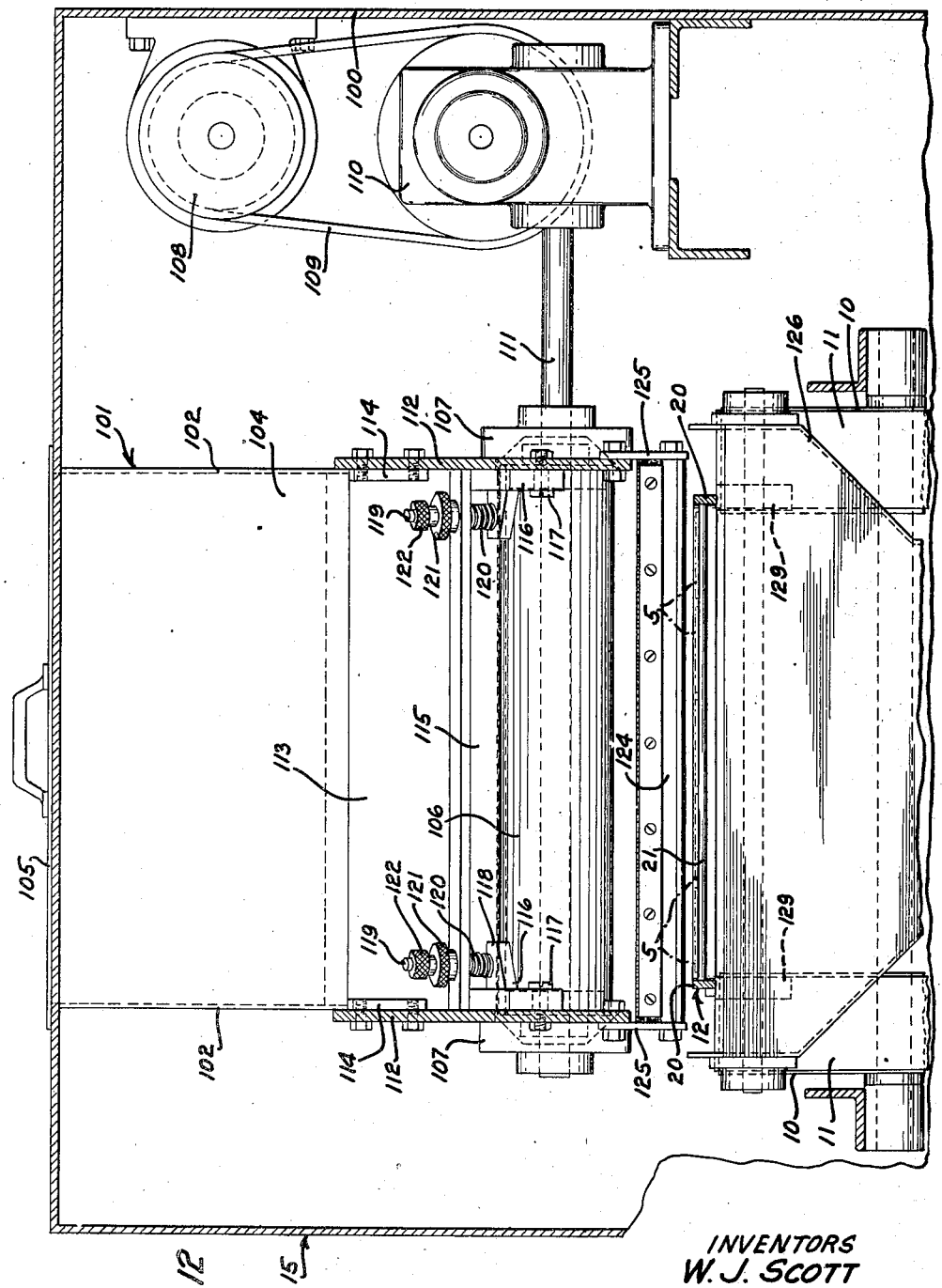
Fig. 12 is a sectional view of Fig. 11, taken on the line 12—12.

To prevent the deposit of enamel on the belts and ways, the ways do not extend through the enamel applying area and the belts are detoured around this area (Fig. 11). The belt pulleys 127 are mounted on bearings 128 below the path of tray travel and they carry the belt below the enamel accumulating portion of the chute 126. To support the tray in its passage through the chute, idler rolls 129 are positioned in the chute on bearings in the machine frame. The belts move the tray into the cabinet through an opening 130 in the cabinet wall, and onto the idler rolls under the screen where the frit is deposited over the entire tray area. Before the rear end of the tray leaves the belts at the entering position, the front end of the tray is engaged by the belts beyond the idler roll and the tray is then moved from the cabinet through a cabinet wall opening 131.

The trays and articles are next carried into the cleaner 16 where the enamel particles are removed from the trays but not from the articles.

Figure 13:
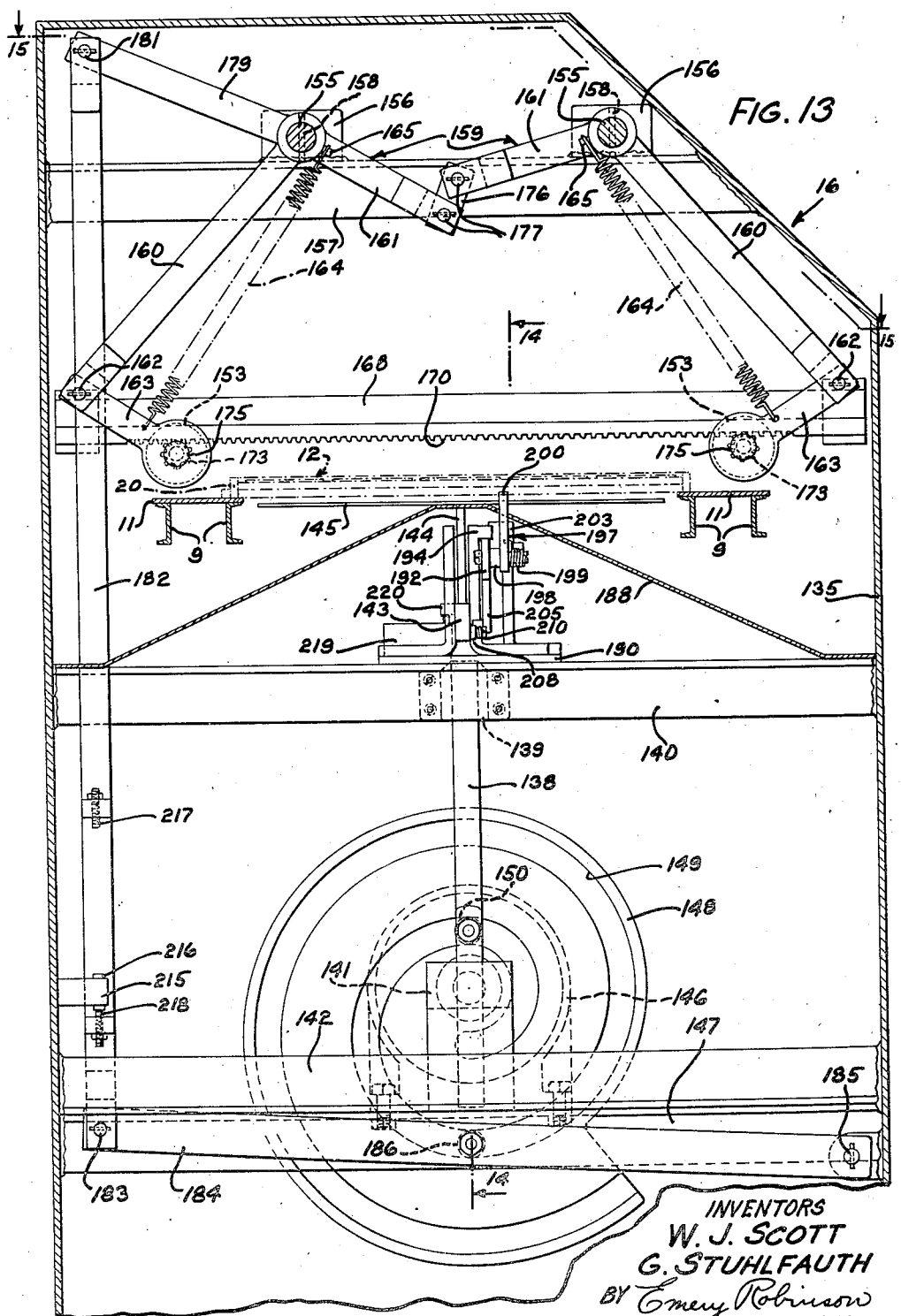
Fig. 13 is a sectional view of Fig. 1, taken on the line 13—13.
Figure 14:
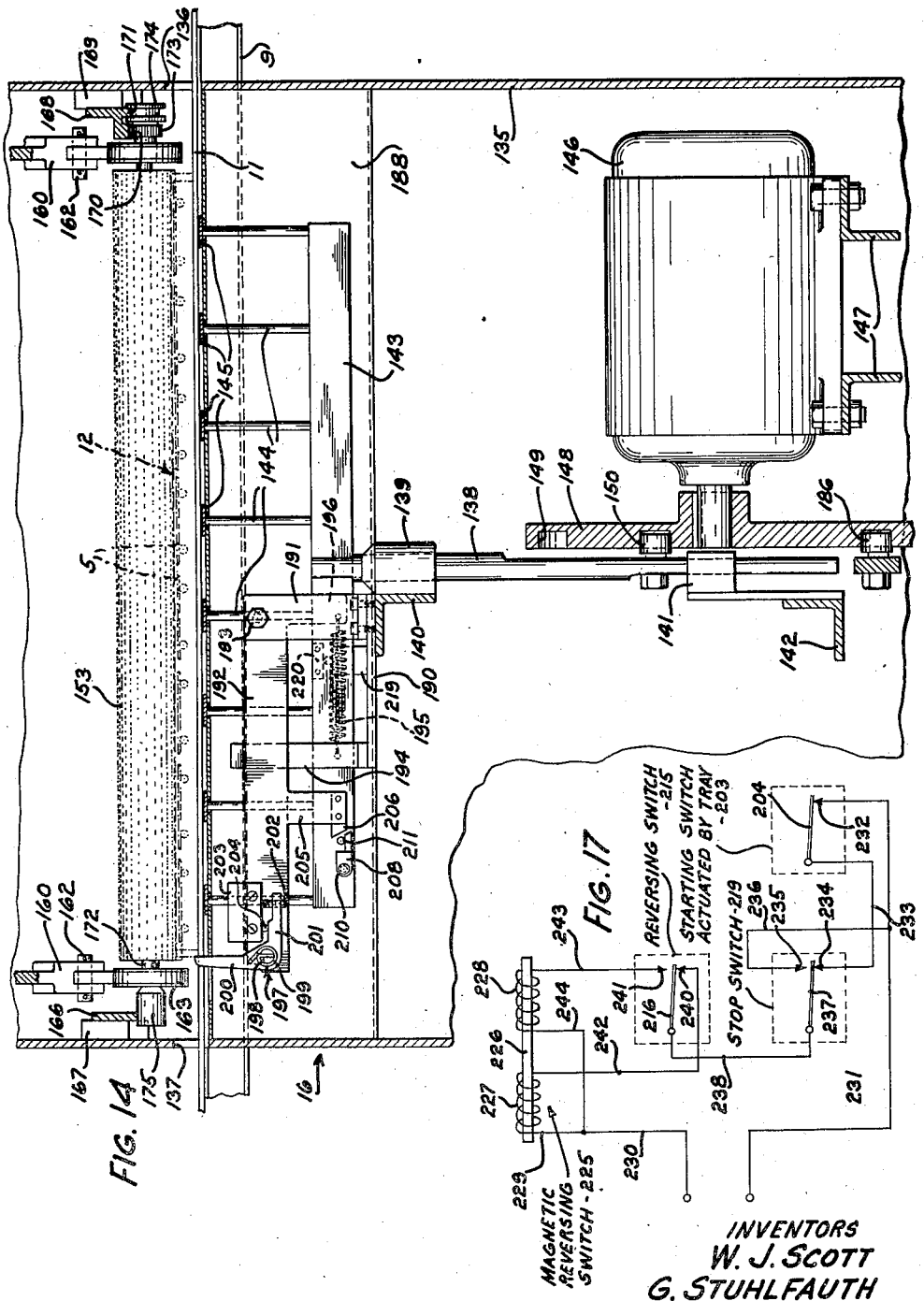
Fig. 14 is a sectional view of Fig. 13, taken on the line 14—14.

The cleaner (Fig. 13) comprises a frame of structural members welded together and an enclosing cabinet 135 made of sheet metal and supported on the frame. The belt supporting ways 9 extend through this cabinet with the inner edge of each way aligned with a side member of the tray. The conveyor belts 11 and the trays enter the cabinet through an opening 136 (Fig. 14) in the cabinet wall and leave the cabinet through another wall opening 137.

Positioned below the ways is a vertical shaft 138 which is supported and adapted for vertical movement in a fixed upper bearing 139 on a frame member 140 and a fixed lower bearing 141 secured to a frame member 142. This shaft is positioned at about the middle of the area occupied by a tray in the cabinet.

Fixed to the top portion of this shaft above the upper shaft bearing is an elongated horizontal member 143 of rectangular cross section extending parallel to and mid-way between the two conveyor belts. Projecting vertically from the top of this member are a series of cylindrical posts 144. These posts are spaced apart a distance equal to the spacing of each pair of article supporting rods in the tray and an article lifting bar 145 is mounted on the top of each post. Each of these article lifting bars extends horizontally for substantially the full distance between the side members of the tray and is dimensioned to fit between a pair of article supporting rods in the tray.

Mechanism is provided to raise these bars and cause them to lift the articles from the tray and then lower the bars to return the articles to the tray. In the base of the cabinet is a reversible gear motor 146 bolted to members 147 of the machine frame. Keyed to the shaft of this motor is a cam 148 having a surface groove 149 therein cut in the form of a spiral. Positioned in the cam groove is a roller 150 mounted on the vertical shaft 138. When the cam is revolved by the gear motor, the roller riding in the groove is raised or lowered across the face of the cam which moves the shaft 138 and the apparatus mounted thereon correspondingly. As the shaft is raised by the cam, the lifting bars engage the articles and raise them above the tray and when the shaft is lowered, the bars deposit the articles on the tray.

During the period that the articles are raised above the tray surface by the lifting bars, the enamel particles are removed from the tray by a pair of rotating cylindrical brushes 153 which pass under the lifting bars across the tray surface. One of these brushes is normally positioned above each of the belts parallel to the edges of the tray (Fig. 13) and mechanism is provided for rotating the brushes and moving each brush inwardly half way across the tray surface.

The two brushes are similar in construction and they are similarly mounted. Each brush is suspended from a rotatable horizontal shaft 155 positioned above and parallel with the belts in end bearings 156 on frame members 157 adjacent to the cabinet wall. Pinned to each end portion of each shaft with a pin 158 is a bell crank 159 having a long arm 160 extending downwardly toward the brush and a short arm 161 extending toward the center of the cabinet. Linked to the end of each bell crank arm 160 on a pin 162 is a brush supporting arm 163. A spiral tension spring 164 has one of its ends fastened to the fulcrum of the bell crank on a pin 165 and its other end fastened to the brush supporting arm 163 at a point near the brush so that the spring tends to rotate the brush and supporting arm upward on its pin 162.

Figure 15:
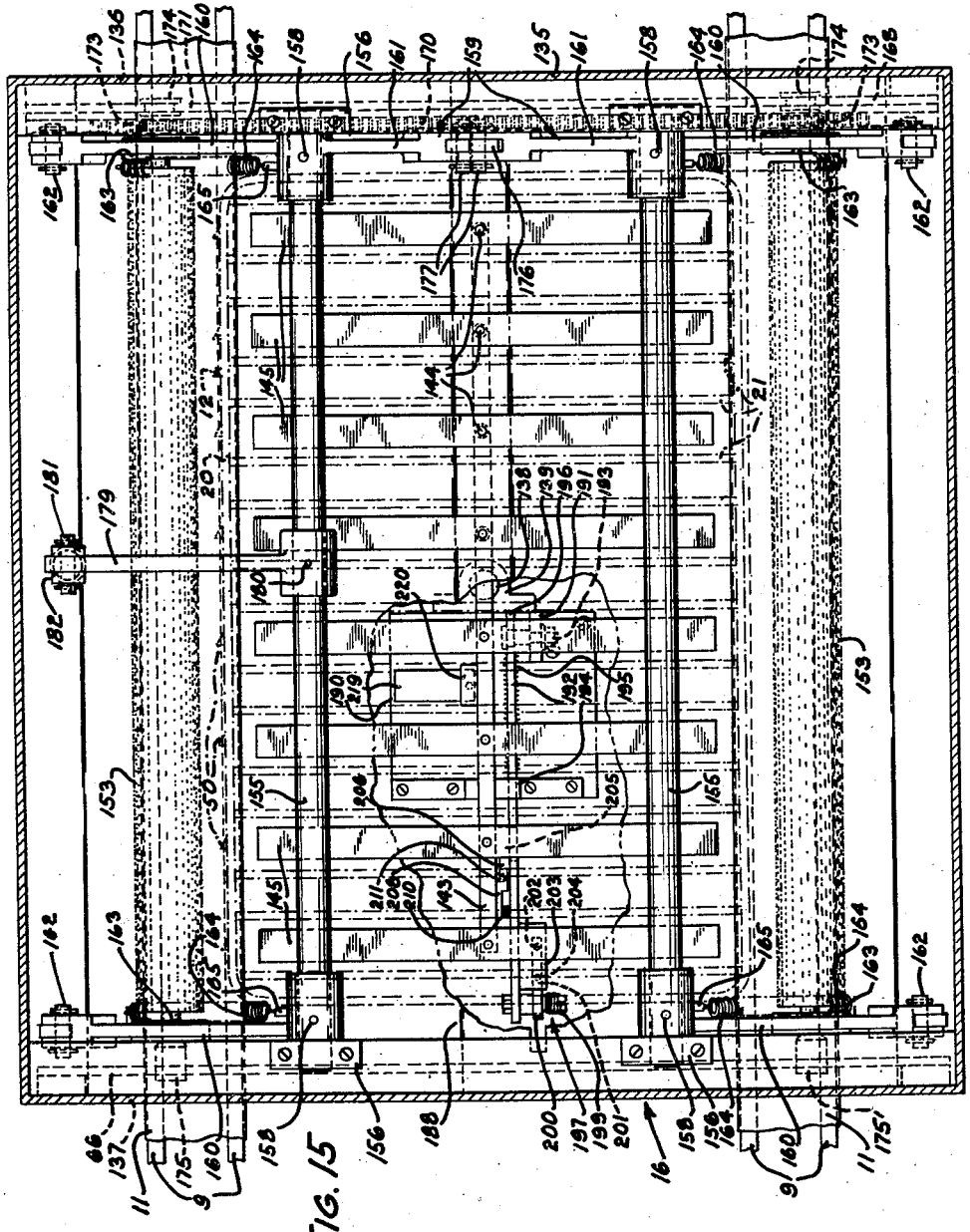
Fig. 15 is a sectional view of Fig. 13 taken on the line 15—15.

These springs hold the brushes in contact with two parallel guides extending across the cabinet above the trays (Figs. 14 and 15) with their guiding portions in a plane parallel to the plane of the tray. One guide bar is mounted at each end of the brushes. The left guide 166 is mounted on brackets 167 on the cabinet wall. At the right end of the brushes is a combination rack-guide 168, mounted on well brackets 169, with a series of teeth 170 in one lower end portion and a guide shoulder 171 adjacent thereto.

Each brush has a shaft 172, which rotatably engages the brush supporting arms 163. Fixed on each brush shaft at one end, outside of the supporting arms, is a gear 173 adapted to engage the teeth 170 in the rack-guide. Outside of the gear a flanged guide roller 174 is freely mounted on the shaft for engagement with the guide shoulder on the guide-rack. On the other end of the brush shaft is a freely mounted roller 175 in engagement with the guide bar 166.

The ends of the short arms 161 in the bell cranks are joined with a link 176 supported on pins 177 on each of the arms, so that motion applied to the cranks pinned to one of the shafts 155 is transmitted to the cranks pinned to the other shaft.

To rotate the shafts 155, and thus move the brushes, a lever arm 179 is secured with a pin 180 to the mid-portion of one of the shafts. (Left shaft in Fig. 13). Linked to the end of the lever on a pin 181 is a vertical brush actuating lever 182 which extends along the side of the cabinet to the bottom of the cabinet. Linked to the bottom of this vertical lever on a pin 183 is a horizontal lever 184 which extends across the bottom of the cabinet and has its opposite end linked on a pin 185 supported on the cabinet wall. Mounted at an intermediate portion of this horizontal lever is a roller 186 in engagement with the spiral groove 149 in the cam 148. As this cam rotates, the roller falls and rises across the cam face to move the vertical lever 182 down and up. As the vertical lever moves down, it rotates the shafts 155 to move all four bell cranks 159 and this motion carries each of the brushes half-way across the surface of the tray. During this travel the brushes are held against their guides by the springs 164 and the gear on each brush shaft is held in engagement with the rack teeth, causing the brushes to rotate and sweep all of the enamel particles from the tray surface onto a sheet metal shield 188 below the tray.

The operation of the cleaner is responsive to the movement of the trays on the conveyor belts and the mechanism is actuated by the arrival of a tray in the cabinet.

Secured to the frame member 140 (Fig. 14) is a control mechanism supporting plate 190. Bolted to this plate is a lever supporting bracket 191 and one end of a shaped lever 192 is pivoted on a pin 193 on this bracket. Also supported on the plate 190 is a stop 194 having an offset top end portion adapted to engage the top of the lever. A coiled spring 195 is mounted under tension between the bottom portion of the stop and a projection 196 depending from the lever below its pivot. This spring tends to hold the lever against the stop.

At the free end of the lever 192 a bell crank 197 is mounted on a pivot 198 with a torque spring 199 also on the pivot. This crank has a vertical arm 200 normally positioned (when the lever is against its stop) in the path of a tray moving into the cabinet. The horizontal arm 201 of the bell crank is normally held against a stop 202 by the spring and this arm actuates a starting switch 203 in the motor circuit, by shifting the switch plunger 204 when the bell crank is moved by a tray. When a tray engages the bell crank arm 200, the crank moves sufficiently to operate the starting switch and then stops, holding the tray stationary during the operation of the article lifting and brushing mechanism. As previously explained, operation of the motor causes the article lifting bars to raise the articles from the tray, the brushes to sweep across the top of the tray, and the bars to replace the articles on the tray. These operations are performed while the tray is held by the bell crank and the conveyor belts slide along the bottom of the tray frame during this period.

After the articles are replaced on the cleaned tray, the tray is released by the bell crank and removed from the cabinet by the belts. Depending from the lever 192 near its mid-portion is a projection 205 on the end of which is mounted a fixed lug 206 having an inclined end surface. Mounted on the member 143, which is supported on the article lifting bar shaft 138, is a pivoted lug 208 having a torque spring 210 to urge it against an upper stop 211. Thus, as the member 143 is raised to lift the articles from the trays, the pivoted lug is deflected against its spring by contact with the inclined surface of the fixed lug and the position of the crank arm is not affected. However, when the member 143 is lowered, the pivoted lug held by its stop engages the flat top of the fixed lug and pivots the bell crank supporting lever 192 through an arc sufficiently to move the vertical crank arm 200 below the bottom of the front tray frame member. This releases the tray and permits the belts to move the tray from the cabinet, after the articles have been returned to the tray. The lever 192 is released and returned to its normal position when it has pivoted sufficiently to clear the ends of the two lugs. Return of the bell crank to normal position does not interfere with the motion of the tray because the article supporting rods are above the top of the crank arm and a portion of the rear tray frame member is cut away to clear the crank arm.

As stated above, the article lifting bars are raised and the brush operating lever 182 is lowered when the motor operates in one direction and reversed when the motor is reversed. To reverse the motor at the proper time, a reversing switch 215 (Fig. 13) with a two-way plunger 216 is mounted on the cabinet wall in the path of switch operating lugs 217 and 218 mounted on the lever 182 above and below the switch. To stop the motor at the end of a complete cycle a stop switch 219 (Fig. 14) is mounted on the plate 190 in the path of a lug 220 on the member 143.

As shown in Fig. 17, the starting, reversing, and stop switches control the reversible motor through a conventional magnetic reversing switch 225 having an armature 226 actuated by a forward coil 227 and a reversing coil 228. The application of current to one of these coils shifts the armature and operates the motor in a corresponding direction. These magnetic switches are commercially available and it is believed that no further description thereof is required here.

One lead 229 from the forward coil is connected to one side 230 of a power line. The other power lead 231 is connected to a contact 232 in the starting switch 203. The plunger 204 in the starting switch is connected through a wire 233 to the normally engaged contact 234 in the stop switch 219. The stop switch has an upper contact 235, which is connected to the power lead 231 through a wire 236. A plunger 237 in this stop switch is adapted to engage these contacts alternately and the plunger is connected through a wire 238 to the plunger 216 in the reversing switch. The reversing switch has a forward contact 240 and a reversing contact 241 which are alternately engaged with the plunger by motion of the brush actuating lever 182. The forward contact 240 is connected to lead 242 on the forward armature coil. The reversing contact 241 is connected to one lead 243 of the reversing coil on the armature and the other lead 244 from the coil is connected to power wire 230.

Normally, the starting switch is open, the stop switch plunger is in engagement with contact 234, and the reversing switch plunger with contact 240. When the starting switch is closed by the arrival of a tray at the bell crank, current flows to the forward coil 227 on the armature through the three control switches to start the motor in a forward direction. As soon as the member 143 is raised by its shaft 138, the plunger in the stop switch shifts from contact 234 to contact 235. However, the latter contact is connected to power line 231 so that the application of current to coil 227 is continued until the brush actuating lever 182 attains its lowest position whereupon the lug 217 on the lever shifts the plunger 216 in the reversing switch from contact 240 to contact 241. This action breaks the circuit to the forward coil 227 on the armature and completes the circuit to the reversing coil 228 to reverse the motor and return the brush and article lifting mechanisms to their normal positions. As the brush actuating lever reaches its highest position, the stud 218 on the lever shifts the reversing switch plunger back to contact 240. Almost simultaneously the article lifting bar supporting member 143 reaches its normal position and moves the stop switch to contact 234. At this time the starting switch has been opened by release of the tray from the bell crank and the motor stops as soon as the stop switch is engaged to complete the cycle.

After the cleaned trays with the enamel bearing articles thereon are released from the cleaner, they are carried by the belts into the oven 17 where the enamel is fused into a coating. The completed articles are removed from the trays at the discharge end of the oven and the empty trays are then returned to the charging end of the apparatus.

The use of mechanical means for applying the enamel frit on the articles provides a highly uniform product. All of the articles pass through the enamel applicator within the same time interval, as controlled by the belt speed, and consequently all articles receive the same quantity of frit and have equal coatings after the frit is fused in the furnace.

The operation of the cleaner in removing all frit from the trays before they enter the furnace prevents fusion of the articles to the tray, with associated article loss, and also prolongs tray life by eliminating the necessity for sand-blasting or acid-dipping the trays to remove fused enamel therefrom.

The adoption of a fully automatic apparatus for applying a complete coating on the articles minimizes process handling and coating expense. By utilizing the travel of the trays or carriers to control the apparatus, the apparatus structure is greatly simplified and proper coordination of the complete mechanism facilitated.

Although a specific apparatus structure adapted for coating a particular type of article has been described in detail, it will be apparent modifications thereof are feasible and it is, therefore, to be understood that the invention is limited only by the scope of the appended claims.

What is claimed is:

1. In a coating apparatus, a tray, a conveyor for moving the tray through the apparatus, means operated by the moving tray for depositing articles on the surface of the tray, means for depositing particles of vitreous enamel over the surface of the moving article bearing tray, and means responsive to the movement of the tray for successively lifting the articles from the tray, removing the enamel particles from the tray and then restoring the articles to the tray without disturbing the enamel deposit on the articles.

2. In an article processing apparatus, a moving belt, a tray on the belt, a hopper containing the articles positioned above the tray, a movable base in said hopper adapted to engage an article in the hopper and advance the article from the hopper, a pivoted article engaging member adjacent to the hopper, and means for moving the hopper base to advance the article, pivoting the article engaging member against the article in its advanced position and restoring the base to normal while the member is applied against the article to transfer the article from the base to the tray.

3. In an article processing apparatus, a moving belt, a tray on the belt, a hopper containing a stack of the articles positioned above the tray, a movable base in said hopper having a surface recess therein adapted to receive the bottom article in the hopper, a hinged bar adjacent to the hopper, an article engaging member on the bar, and a driving means to move the base for advancing the article and pivot the article engaging member to hold the advanced article while the base is restored to its normal position in the bottom of the hopper.

4. In an article coating apparatus, a moving belt, a tray on the belt, a hopper containing the articles positioned above the tray, a movable base in said hopper having a surface recess therein dimensioned to receive one of the articles, a pivoted arm for supporting the hopper base, a drive shaft, a cam on the shaft for pivoting the arm to move the base across the bottom of the hopper and withdraw the bottom article therefrom and then restore the base to its normal position, a hinged bar adjacent to the hopper, an article engaging member on the bar, and a second cam on the drive shaft for pivoting the bar to apply the article engaging member against the advanced article and hold the article while the base is restored to transfer the article from the base to the tray.

5. In an apparatus for processing articles having an opening therein, a moving belt, a hopper containing the articles positioned above the belt, a movable base in said hopper dimensioned to receive one of the articles, a pivoted arm engaging the base, means for pivoting said arm to move the base across the bottom of the hopper and advance an article therefrom and then restore the base to its normal position, a pivotally mounted pin adjacent to the hopper, and means for pivoting the pin into the opening in the advanced article to hold the article while the base is restored and transfer the article from the base to the belt.

6. In an apparatus for coating articles having an opening therein, a moving belt, a tray on the belt, a hopper containing the articles positioned above the tray, a movable base in said hopper dimensioned to receive one of the articles, a pivoted arm for supporting the base, a drive shaft, a cam on the shaft engaging the arm to pivot the arm and move the base across the bottom of the hopper for withdrawing an article from the hopper, a hinged bar adjacent to the hopper, a pin depending from the bar, an actuating rod on the bar, and a second cam on the drive shaft engaging the rod to pivot the bar and hold the pin in the opening in the advanced article while the base is restored to its normal position to permit the article to slide from the pin onto the tray.

7. In an article processing apparatus, a moving belt, a tray on the belt, a hopper containing the articles positioned above the tray, a movable base in said hopper adapted to receive one of the articles, a pivoted arm engaging the base for moving the base to advance an article and then restore the base to its normal position, a pivoted article engaging member adjacent to the hopper for engaging the advanced article and holding the article while the base is restored to transfer the article from the base to the tray, and a common actuating means for the base and article engaging member, said actuating means being responsive to the movement of the tray on the conveyor.

8. In an article processing apparatus, a moving belt, a tray on the belt, a hopper containing the articles positioned above the tray, a movable base in said hopper dimensioned to receive one of the articles, a pivoted arm for supporting the hopper base, a drive shaft, a cam on the shaft engaging the arm to pivot the arm and move the base across the bottom of the hopper advancing an article therefrom and then restore the base to its normal position, a pivoted article engaging member adjacent to the hopper, an actuating lever on the article engaging member, a second cam on the drive shaft engaging the lever for pivoting the article engaging member against the advanced article and holding the article while the base is restored to transfer the article from the base to the tray, a drive motor on the shaft, a motor switch adjacent to the belt, and a lug on the tray for operating the motor switch.

9. In an article processing apparatus, a moving belt, a tray on the belt, a hopper containing the articles positioned above the belt, a movable base in said hopper dimensioned to receive one of the articles, a pivoted arm engaging the base, a drive shaft, a cam on the shaft engaging the arm for pivoting the arm to move the base across the bottom of the hopper advancing the bottom article therefrom and then restoring the base to its normal position, a pivoted article engaging member adjacent to the hopper, an actuating lever on said member, a second cam on the drive shaft for pivoting the lever to apply the article engaging member against the advanced article and hold the article while the base is restored to its normal position, a drive motor on the shaft, a motor starting switch adjacent to the belt, a lug on the tray for operating the motor starting switch, a motor stopping switch adjacent to the drive shaft, and a switch operating cam on the drive shaft engaging the motor stopping switch.

10. In an article processing apparatus, a moving belt, a tray on the belt, a hopper containing the articles positioned above the belt, a movable base in said hopper for advancing an article from the hopper, a pivoted operating arm on the base, a drive shaft, a cam on the shaft for pivoting the base operating arm, a pivoted article engaging member adjacent to the base, a second cam on the drive shaft for pivoting the article engaging member, a motor on the drive shaft, a clutch on the drive shaft, a pair of opposed solenoids having their plungers linked together, a clutch operating lever connected to the linked plungers, and means responsive to the movement of the tray for selectively operating the solenoids.

11. In an article processing apparatus, a moving belt, a tray on the belt, a hopper containing the articles positioned above the belt, a pivoted base in said hopper dimensioned to receive one of the articles, a drive shaft, a cam on the shaft for pivoting the base to advance the article and then restore the base to its normal position, a pivoted article engaging member adjacent to the base, a cam on the drive shaft for pivoting the member against the advanced article and holding the article while the base is restored, a motor on the drive shaft, a clutch on the drive shaft, a pivoted operating lever on the clutch, a solenoid having its plunger connected to the lever for pivoting the lever and engaging the clutch, a switch for said solenoid positioned adjacent to the belt, a lug on the tray adapted to engage said switch, a second solenoid having its plunger connected to the clutch lever to pivot the lever and disengage the clutch, a switch for said second solenoid positioned adjacent to the drive shaft, and a cam on the drive shaft engaging the switch for the second solenoid.

12. In an article coating apparatus, a conveyor, an article bearing tray on the conveyor, means for depositing coating material over the surface of the moving article bearing tray, and adjacent means for removing the coating material from the tray, said removing means comprising a movable article lifting member, a motor for moving the member to lift the articles from the tray and then restoring the member to return the articles to the tray, a pivotally mounted brush normally positioned adjacent to the tray, and a pivoted lever connected to the brush and actuated by the motor for moving the brush across the surface of the tray during the period that the articles are positioned above the tray by the lifting member.

13. In an article coating apparatus, a conveyor, an article bearing tray on the conveyor, means for depositing vitreous enamel frit over the surface of the article bearing tray, and means for removing the frit from the tray without disturbing the frit on the articles, said removing means comprising a vertically movable shaft, an article lifting bar on top of the shaft, a motor for raising the shaft to lift the articles above the tray and then lower the shaft to return the articles to the tray, a rotating brush pivotally mounted and normally positioned adjacent to the tray, and a pivoted lever connected to the brush and operated by the motor for moving the brush across the surface of the tray to sweep the frit therefrom during the period that the articles are positioned above the tray by the lifting bar.

14. In an article coating apparatus, a conveyor, an article bearing tray on the conveyor, said tray having a frame and a series of transverse spaced rods supporting the articles, means for depositing coating material over the surface of the article bearing tray, and means for removing the coating material from the tray, said removing means comprising a vertically movable shaft, an article lifting bar on the shaft dimensioned to fit between adjacent rods on the tray, a motor for raising the shaft to insert the bar between the rods and lift the articles above the tray and then lowering the shaft to return the articles to the tray, a pivotally mounted brush normally positioned adjacent to the tray, and a pivoted lever connected to the brush and operated by the motor for moving the brush across the surface of the tray to sweep the coating material therefrom during the period that the articles are positioned above the tray by the lifting bar.

15. In an article coating apparatus, a constantly moving conveyor, an article bearing tray on the conveyor, means for depositing coating material over the surface of the article bearing tray, and means for removing the coating material from the tray, said removing means comprising a pivoted arm, a tray holding member on said arm normally positioned in the path of a moving tray, a vertically movable shaft, an article lifting bar on the shaft, a motor for raising the shaft to lift the articles above the tray and then lowering the shaft to return the articles to the tray, a pivoted brush normally positioned adjacent to the tray, a pivoted lever connected to the brush and operated by the motor for moving the brush across the surface of the tray to sweep the coating material therefrom during the period that the articles are positioned above the tray by the lifting bar, and a lug on the shaft adapted to pivot the arm and release the tray when the shaft is lowered.

16. In an article coating apparatus, a continuously moving conveyor, an article bearing tray on the conveyor, means for depositing coating material over the surface of the tray and articles, and means for removing the coating material from the tray, said removing means comprising a vertical shaft below the conveyor adapted for longitudinal movement, an article lifting bar on said shaft, a rotating brush pivoted above the conveyor, a pivoted lever on the brush, a drive motor, a cam on the drive motor in engagement with the shaft and the brush lever for raising and lowering the shaft, and moving the brush across the tray, a motor switch mounted adjacent to the conveyor, and a pivoted member normally positioned in the path of a tray on the conveyor to operate said switch when engaged by a tray and to hold the tray stationary on the moving conveyor during the operation of the article lifting bar and the brush.

17. In an article coating apparatus, a continuously moving conveyor, an article bearing tray on the conveyor, means for depositing coating material over the surface of the tray and articles, and means for removing the coating material from the tray, said removing means comprising a vertical shaft adapted for vertical movement, a horizontal arm extending from the top of the shaft below the tray, an article lifting bar on said arm, a pivotally mounted brush, an actuating rod on the brush, a drive motor, a cam on the drive motor in engagement with the shaft and brush actuating rod for raising and lowering the shaft, and moving the brush across the surface of the tray, a pivoted lever adjacent to the conveyor, a member on said lever normally positioned in the path of a tray on the conveyor for holding the tray stationary on the moving conveyor during the operation of the article lifting arm and brush, a fixed lug on the lever, and a pivoted lug on the horizontal arm positioned to engage the fixed lug during the downward movement of the shaft and move the tray engaging member to a position below the tray.

18. In an article coating apparatus, a conveyor, an article bearing tray on the conveyor, means for depositing coating material over the surface of the tray and articles, and means for removing the coating material from the tray, said removing means comprising a movable vertical shaft, an article lifting bar on the shaft, a pivotally mounted brush adjacent to the tray, an actuating rod on the brush, a reversible motor, a cam on the motor in engagement with the shaft and the brush rod, a motor starting switch adjacent to the conveyor, a pivoted member normally positioned in the path of a tray on the conveyor to operate said switch when engaged by a tray and start the motor in one direction, a motor reversing switch adjacent to the brush rod, a lug on the rod for operating the reversing switch at the limit of rod movement, a motor stopping switch positioned adjacent to the shaft, and a lug on the shaft positioned to engage the motor stopping switch when the shaft returns to its normal position.

19. In an article coating apparatus, a continuously moving conveyor, an article bearing tray on the conveyor, said tray having a frame and a series of transverse rods supporting the articles, means for depositing coating material over the surface of the tray and articles, and means for removing the coating material from the tray, said removing means comprising a vertical shaft adapted for vertical movement, an article lifting bar on the shaft dimensioned to fit between adjacent tray rods, a pivoted brush rotatably mounted adjacent to the tray, an actuating rod on the brush, a gear on the brush, a drive motor, a cam on the drive motor in engagement with the shaft and brush rod for raising and lowering the shaft and moving the brush across the tray surface while the shaft is raised, and a rack mounted above the tray to engage the brush gear and rotate the brush during its travel across the tray surface.

20. In an article coating apparatus, a conveyor, an article bearing tray on the conveyor, means for depositing coating material over the surface of the tray and articles, and means for removing the enamel from the tray, said material removing means comprising a vertical shaft adapted for longitudinal movement, an article lifting bar on the shaft, a pivotally mounted brush normally positioned adjacent to the tray, an actuating rod on the brush, a reversible motor, a cam on the motor in engagement with the shaft and the brush rod, a motor starting switch mounted adjacent to the conveyor, a pivoted member adjacent to the switch normally positioned in the path of a tray and adapted to operate said switch when engaged by a tray to start the motor in one direction to raise the shaft and move the brush across the tray surface, a motor reversing switch adjacent to the brush rod, a lug on the rod adapted to engage the reversing switch and cause the motor to restore the shaft and brush to their normal positions, a motor stopping switch adjacent to the shaft, and a lug on the shaft to engage the motor stopping switch when the shaft is restored to its normal position.

21. In an article coating apparatus, a tray, a conveyor for moving the tray through the apparatus, means for depositing a plurality of articles uniformly over the surface of the tray, means for depositing finely divided particles of coating material over the surfaces of the tray and articles, and means actuated by the moving tray for engaging and spacing the articles from the tray for a time interval and removing the particles of coating material from the tray during the interval that the articles are spaced therefrom.

WALTER J. SCOTT.
GEORGE STUHLFAUTH.